United States Patent [19]

Makowski, deceased

[11] 4,310,445

[45] Jan. 12, 1982

[54] PROCESS FOR FORMING A BARIUM SULFONATE CONTAINING POLYMER

[75] Inventor: Henry S. Makowski, deceased, late of Scotch Plains, N.J., by Patricia H. Makowski, executrix

[73] Assignee: Exxon Research & Engineering Co., Florham Park, N.J.

[21] Appl. No.: 207,782

[22] Filed: Nov. 18, 1980

[51] Int. Cl.$^3$ .............................................. C08L 91/00
[52] U.S. Cl. ...................... 260/23.5 A; 260/23.7 B; 260/33.6 R; 525/366
[58] Field of Search ................. 525/366; 260/23.5 A, 260/23.7 B, 33.6 R

[56] References Cited

U.S. PATENT DOCUMENTS 4,172,820 10/1979 Lundberg et al. .................. 525/366

Primary Examiner—Joseph L. Schofer
Assistant Examiner—N. Sarofim
Attorney, Agent, or Firm—Richard E. Nanfeldt

[57] ABSTRACT

This invention relates to a process for the formation of a neutralized sulfonated polymer having about 10 to about 60 meq. sulfonate groups, wherein the sulfonate groups are neutralized with a barium counterion. A cement of a polymer having olefinic functional groups and a non-reactive solvent is contacted with a sulfonating agent such as an acyl sulfate. After terminating the sulfonation reaction by quenching with methanol, the sulfonated polymer is then neutralized with a solution of barium hydroxide, barium acetate or barium carboxylate dissolved in a carboxylic acid having about 1 to about 4 carbon atoms or a combination solvent of methanol and a carboxylic acid. A carboxylic acid having at least about 10 carbon atoms can be then added to the cement of the neutralized sulfonated polymer thereby forming a barium salt of the carboxylic acid having at least about 10 carbon atoms in situ, wherein the barium salt of the carboxylic acid having at least about 10 carbon atoms is a preferential plasticizer for the zinc sulfonate groups. The Brookfield viscosity at 3.0 rpm at room temperature of the cement of the barium neutralized sulfonated polymer is less than about 50,000 cps.

12 Claims, No Drawings

PROCESS FOR FORMING A BARIUM SULFONATE CONTAINING POLYMER

BACKGROUND OF THE INVENTION

1. Field of the Invention

This invention relates to a process for the formation of a neutralized sulfonated polymer having about 10 to about 60 meq. sulfonate groups, wherein the sulfonate groups are neutralized with a barium counterion. A cement of a polymer having olefinic functional groups and a non-reactive solvent is contacted with a sulfonating agent such as an acyl sulfate. After terminating the sulfonation reaction by quenching with methanol, the sulfonated polymer is then neutralized with a solution of barium hydroxide, barium acetate or barium carboxylate dissolved in a carboxylic acid having about 1 to about 4 carbon atoms or a combination solvent of methanol and a carboxylic acid. A carboxylic acid having at least about 10 carbon atoms can be then added to the cement of the neutralized sulfonated polymer thereby forming a barium salt of the carboxylic acid having at least about 10 carbon atoms in situ, wherein the barium salt of the carboxylic acid having at least about 10 carbon atoms is a preferential plasticizer for the zinc sulfonate groups. The Brookfield viscosity at 3.0 rpm at room temperature of the cement of the barium neutralized sulfonated polymer is less than about 50,000 cps.

2. Description of the Prior Art

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The SO$_3$H groups of the sulfonated elastomer can be readily neutralized on a two-roll mill with a basic material to form an ionically cross-linked elastomer at room temperature having substantially improved physical properties over an unsulfonated elastomer. These sulfonated elastomers, may be processed somewhat like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from the group consisting of Groups I, II, III, IV, V, VIB, VIIB and VIII and mixtures thereof of the Periodic Table of Elements.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the unneutralized sulfonated elastomeric polymers in solution are organic amines dissolved in an aliphatic alcohol. The resultant neutralized sulfonated elastomeric polymer prepared by this process exhibit somewhat inferior physical properties due to a rather low degree of ionic association.

U.S. Pat. Nos. 3,870,841 and 3,847,854 herein incorporated by reference, teach a method of plasticization of the polymeric backbone of a neutralized sulfonated polymer. The plasticizing agent is incorporated into the sulfonated polymer by hot melting the neutralized sulfonated polymer with the plasticizing agent. Although the rheological properties are improved, the incorporation of these plasticizing agents into the neutralized sulfonated polymers is extremely difficult and usually results in a general decrease in physical properties.

The four aforementioned patents teach the method of compounding the additives into the neutralized sulfonated elastomeric polymer under high heat and shear conditions or the use of an organic amine neutralizing agent thereby resulting in compositions either having poor rheological or physical properties.

The present invention teaches a new improved process for the formation of an improved gel-free neutralized sulfonated polymer having both excellent rheological and physical properties. The improvement in the process comprises the neutralization of the sulfonated cement by the addition of a barium type neutralizing agent dissolved in a solvent system of a carboxylic acid having about 1 to about 4 carbon atoms or a mixture of methanol and a carboxylic acid having about 1 to about 4 carbon atoms which can be followed by the subsequent addition of a carboxylic acid having at least about 10 carbon atoms to form in situ a barium salt of the carboxylic acid having at least about 10 carbon atoms which acts as a preferential plasticizer for the barium neutralized sulfonate groups.

SUMMARY OF THE INVENTION

The complete process for the production of neutralized and plasticized sulfonated polymers requires, after sulfonation, the effective neutralization of the unneutralized sulfonate groups with ionic reagents to produce a cement which is gel-free and low in viscosity. It has been found that such a process can be achieved when the sulfonated cement is neutralized with a solution of a barium type neutralizing agent and a carboyxlic acid solvent having about 1 to about 4 carbon atoms or a mixture of methanol and a carboxylic acid solvent having about 1 to about 4 carbon atoms. The neutralization can be followed by the subsequent addition of a carboxylic acid having at least about 10 carbon atoms thereby forming in situ the barium neutralized sulfonated polymer and a barium salt of the carboxylic acid having at least about 10 carbon atoms. A water cosolvent can be used with the carboxylic acid cosolvent or the combined solvent of the carboxylic acid cosolvent and methanol as long as the volume % of water does not exceed 35%. The resultant Brookfield viscosity at room temperature at about 3.0 rpm of the cement of the neutralized sulfonated polymer is less than about 50,000 cps. The barium neutralized sulfonated polymer derived from this process are essentially gel-free and possess excellent physical and rheological properties.

GENERAL DESCRIPTION OF THE INVENTION

The present invention relates to a unique and novel improved process for the manufacture of a gel-free neutralized sulfonated polymer having both improved physical and rheological properties, by sulfonation of an unsaturated elastomer in a solution of a non-reactive solvent, and the neutralization of the sulfonate groups of the sulfonated elastomer in the cement by the addition of a solution of barium type neutralizing agent in a solvent system of a carboxylic acid having about 1 to about 4 carbon atoms or a mixed solvent system of methanol and a carboxylic acid having about 1 to about 4 carbon atoms. Alternatively, a solvent system comprising a carboxylic acid having about 1 to about 4 carbon atoms and water or a carboxylic acid having about 1 to about 4 carbon atoms, methanol and water can be used as long as the volume % of the water does not exceed about 35%. After the neutralization of sulfonated cement has been completed, a carboxylic acid having at least about 10 carbon atoms such as stearic acid can be optionally added to the cement, wherein the excess barium type neutralizing agent reacts in situ with the carboxylic acid such as stearic acid thereby forming the preferential plasticizer, barium stearate which is a plasticizer for the barium neutralized sulfonate groups. This improved process allows for complete neutralization of the sulfonate groups and the formation of cements which are easily handled and pumped. The polymers useful in the instant invention can be elastomeric polymers and/or polystyrene thermoplastic resins.

The elastomeric polymers of the present invention are derived from elastomers having olefinic unsaturation sites wherein the polymer has from about 0.1 to about 10.0 mole % olefinic unsaturation. The unsaturation sites can be in the polymer backbone, pendant therefrom or cyclic except that aromatic polymers are excluded from this description. In particular, the unsaturated polymers of this present invention include low unsaturated polymers such as Butyl rubber or EPDM terpolymers.

The sulfonated polymers of this invention contain less than about 5 wt. % gel, more preferably less than about 3, and most preferably less than about 1 as measured by stirring a given weight of polymer in a solvent comprised of 95 toluene/5-methanol at a concentration of 50 g/liter for 24 hours, allowing the mixture to settle, withdrawing a weighted sample of the supernatant solution and evaporating to dryness.

In the practice of this invention, the molecular weight of the elastomeric polymer and the concentration of the elastomeric polymer in the non-reactive sulfonation solvent are very important. In order to have a viable process, the neutralized sulfonated cement at the end of the process must have sufficiently low viscosity so that the cement may be properly handled with pumping operations, cleaning operations, and the like. The major factors which contribute to the viscosity of the final neutralized sulfonated cement are molecular weight of the base elastomeric polymer, the concentration of the elastomeric polymer in the non-reactive sulfonation cement, the relative amount of sulfonate groups incorporated into the elastomeric polymer, the polar solvent used in reducing ionic associations thereby reducing the viscosity of the neutralized cement, and the amount of water in the cement.

In order to have an economical process, it is necessary to sulfonate elastomeric polymer cements containing at least about 50 g elastomeric polymer per liter of non-reactive solvent, since in a commercial manufacturing process, solvents must be recovered and recycled. The more solvent recycled per unit elastomeric polymer product, the more expensive the product. In the instant invention, the preferred elastomeric polymer concentration in non-reactive solvent is at least about 50 g/liter.

In addition, it is necessary that the elastomeric polymer cements be low in viscosity. Sulfonation of the polymer cement does not result in substantial viscosity increases; however, neutralization results in very large solution viscosity increases, or in the extreme gel, due to the ionic associations. Therefore, it is important to keep the starting cement viscosities low by using polymer concentrations as low as economically feasible. However, high polymer concentrations are still possible if the molecular or Mooney viscosities are low. It is important therefore in the practice of this invention to use elastomeric polymers with as low Mooney viscosities as possible.

It has been found that neutralized sulfonated polymers possess good physical properties even if the Mooney viscosity (ML, 1+8, 212° F.) of the starting polymer is about 5. On the other hand, at the high Mooney viscosities when cements containing 50 g polymer/liter solvent are sulfonated and neutralized extremely high final cement viscosities are obtained. The process of this invention can be practiced when the elastomeric polymer cement at a concentration of 50 g polymer/liter of non-reactive solvent possesses at 25° C. a Brookfield viscosity of 0.6 rpm of 2500 centipoise (cps) or less. The Mooney viscosity (ML, 1+8, 212° F.) of the elastomeric polymer is preferably about 5 to about 60, more preferably about 10 to about 50, and most preferably about 15 to about 25.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin. The preparation of Butyl rubber is described in U.S. Pat. No. 2,356,128 which is incorporated herein by reference. For the purposes of this invention, the Butyl rubber may have incorporated therein from about 0.2 to 10% of combined multiolefin; preferably about 0.5 to about 6%; more preferably about 1 to about 4%, e.g. 2%. Illustrative of such a Butyl rubber is Exxon Butyl 365 (Exxon Chemical Co.), having a mole % unsaturation of about 2.0 and a Mooney viscosity (Ml, 1+8, 212° F.) of about 45. Very low molecular weight Butyl rubbers, i.e. Butyl rubbers having a viscosity average molecular weight of about 5,000 to 85,000 and a mole % unsaturation of about 3 to about 4% may be sulfonated by the process of this invention. Preferably, these polymers have a viscosity average molecular weight of about 25,000 to about 60,000.

The term "EPDM" is used in the sense of its definition as found in ASTM D-1418-64 and is intended to mean a terpolymer containing ethylene and propylene in the backbone and unsaturation in a side chain. Illustrative methods for producing these terpolymers are found in U.S. Pat. No. 3,280,082, British Pat. No. 1,030,289 and French Pat. No. 1,386,600, which are incorporated herein by reference. The preferred terpolymers contain about 45 to about 75 wt. % ethylene and about 1 to about 10 wt. % of a diene monomer, the balance of the polymer being propylene. Preferably, the polymer contains about 45 to about 70 wt. % ethylene, e.g. 50 wt. % and about 2.6 to about 8.0 wt. % diene monomer, e.g. 5.0 wt. %. The diene monomer is preferably a non-conjugated diene. Illustrative of these non-conjugated diene monomers which may be used in the EPDM terpolymer (EPDM) are 1,4-hexadiene, dicyclopentadiene, 5-ethylidene-2-norborne, 5-methylene-2-norbornene, 5-propenyl-2-norborne and methyl tetrahydroindene. A typical EPDM is Vistalon 2504 (Exxon Chemical Co.) a terpolymer having a Mooney viscosity (ML, 1+8, 212° F.) of about 40 and having 50 wt. % of ethylene, 45 wt. % of propylene, and 5.0 wt. % of 5-ethylidene-2-norbornene with an $\overline{M}n$ as measured by GPC of about 47,000, an $\overline{M}v$ as measured by GPC of about 145,000 and an $\overline{M}w$ as measured by GPC of about 174,000. Another EPDM terpolymer, Vistalon 2504-20 is derived from Vistalon 2504 (Exxon Chemical Co.) by a controlled extrusion process, wherein the resultant Mooney viscosity (ML, 1+8, 212° F.) is about 20. The $\overline{M}n$ as measured by GPC of Vistalon 2504-20 is about 26,000, the $\overline{M}v$ as measured by GPC is about 90,000 and the $\overline{M}W$ as measured by GPC is about 125,000.

Nordel 1320 (DuPont) is another EPDM terpolymer having a Mooney viscosity (ML, 1+8, 212° F.) of about 25 and having about 53 wt. % of ethylene, about 3.5 wt. % of 1,4-hexadiene and about 43.5 wt. % of propylene.

The polystyrene thermoplastics suitable for use in the practice of the invention have a glass transition temperature from about 90° C. to about 150° C., more preferably about 90° C. to about 140° C. and most preferably about 90° C. to about 120° C. These polystyrene resins have a weight average molecular weight of about 5,000 to about 500,000, more preferably about 20,000 to about 350,000 and most preferably about 90,000 to about 300,000. These base polystyrene thermoplastic resins can be prepared directly by any of the known polymerization processes. The term "thermoplastic" is used in its conventional sense to mean a substantially rigid (flexus modulus 10,000 psi) material capable of retaining the ability to flow at elevated temperatures for relatively long times.

The preferred polystyrene thermoplastic resin is a homopolymer of styrene having a number average molecular weight of about 180,000, and an intrinsic viscosity in toluene of about 0.8. These polymers are widely available commercially in large volume. A suitable polystyrene resin is Styron 666 (Dow Chemical) which affords a suitable molecular weight.

The olefinically unsaturated polymer is dissolved in a suitable non-reactive solvent at a concentration level of about 2 to about 25 wt. %, more preferably at about 5 to about 20 and most preferably at about 10 to about 15. Suitable solvents for sulfonation are selected from the group consisting of chlorinated aliphatic hydrocarbons such as 1,2-dichloroethane, halogenated aromatic hydrocarbons such as chlorobenzene, alicyclic hydrocarbons such as cyclohexane and aliphatic hydrocarbons having about 4 to about 7 carbon atoms, more preferably 5 to 6, such as isomeric pentanes and hexanes and mixtures thereof. In terms of an economical process, halogenated solvents are less preferred as well as solvents boiling above about 80° C. Preferred solvents are hydrocarbons boiling at about or below 80° C. such as hexane and cyclohexane. The most preferred solvents are the saturated aliphatic hydrocarbons containing from 4 to 6 carbon atoms and mixtures thereof. The olefinically unsaturated polymer dissolved in the solvent is contacted in the reaction zone with a sulfonating agent selected from the group consisting of an acyl sulfate, or a sulfur trioxide donor complexed with a Lewis base containing oxygen, sulfur or phosphorous.

The term "sulfur trioxide donor" as used in the specification means a compound containing available sulfur trioxide. Illustrative of such sulfur trioxide donors are $SO_3$, chlorosulfonic acid, and fluorosulfonic acid. The term "complexing agent" as used in the specification means a Lewis base, wherein Lewis base is an electron pair donor. Illustrative of Lewis base suitable for use as complexing agents are certain phosphorous compounds. While the phosphorous compound may be either inorganic or organic, it is preferred that the phosphorous compound be an organic compound. Various organic phosphites, phosphinites, phosphinates, phosphates, phosphonates, phosphonites and phosphines may be used as the complexing agent. The organic substituents consist of $C_1$ to $C_{10}$ alkyl, aryl, alkarlyl, or aralkyl groups. The nitrogen containing Lewis bases form highly stable complexes with sulfur trioxide donor and are not considered suitable for sulfonation of the unsaturated polymers of this invention. Other Lewis bases suitable as complexing agents are those Lewis bases which contain oxygen or sulfur. Ethers and thioethers have been found useful for complexing sulfur trioxide donor to moderate reaction with the unsaturation of polymer molecules. The ethers and thioethers may contain one, two or more ether oxygens or sulfurs and may be linear or cyclic. Illustrative of the ether Lewis bases suitable for use in the practice of this invention are tetrahydrofuran, p-dioxane, 2,3-dichloro-1,4-dioxane, m-dioxane, 2,4-dimethyl-1,3-dioxane, 2-phenyl-1,3-dioxane, diethyl ether, trioxane, and bis (2-chloroethyl)-ether. The preferred oxygen containing bases are p-dioxane, tetrahydrofuran and bis-(2-chloroethyl) ether. Illustrative of the thioethers are diethyl sulfide and tetrahydrothiophene. Other oxygen containing Lewis bases suitable as complexing agents are carboxylic acid esters wherein the carboxylic acid is a $C_1$ to $C_{10}$ aliphatic acid, benzoic acid, or phenylacetic acid. Illustrative of such esters are benzyl acetate, butyl acetate, butyl propionate, methyl benzoate, p-nitrophenyl acetate, ethyl-n-butyrate, ethyl stearate, and ethyl phenyl acetate. The molar ratio of $SO_3$ donor to complexing agent may be as high as 15 to 1; preferably less than about 9:1; more preferably about 4:1 to about 1:1, e.g. 2:1. The preferred solvents for preparation of the complexes of sulfur trioxide donor with complexing agents containing oxygen or sulfur are chlorinated hydrocarbons. Illustrative of such chlorinated solvents are carbon tetrachloride, dichloroethane, chloroform and methylene chloride. The complexes may also be prepared by direct addition of reagents, if precautions are taken to dissipate evolved heat. The reactions of ethereal complexes of $SO_3$ with the unsaturation of polymer chains has been found to be non-quantitive. Therefore, the use of excess complex is required to give the desired level of sulfonation.

The preferred sulfonating agents of the instant invention are the acyl sulfates, in particular acetyl sulfate. The acyl sulfates which are selected from the group consisting of acetyl, propionyl, butyryl, or benzoyl sulfate in particular acetyl sulfate. The acyl sulfate may be produced by reacting concentrated sulfuric acid with an acid anhydride. For example, acetic anhydride may be reacted with sulfuric acid to form acetyl sulfate which may be used to sulfonate the polymers of this invention. If desired, acetic anhydride may be added to a solution of the polymer in a suitable solvent and sulfuric acid subsequently added to form acetyl sulfate in situ. Alternatively, sulfur trioxide may be reacted with acetic acid to form the acetyl sulfate.

The preferred sulfonating agent is acetyl sulfate which can be prepared according to the following equations:

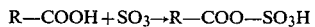
R—COOH+SO₃→R—COO—SO₃H

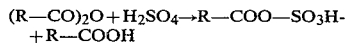
(R—CO)₂O+H₂SO₄→R—COO—SO₃H-
+R—COOH

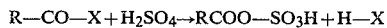
R—CO—X+H₂SO₄→RCOO—SO₃H+H—X

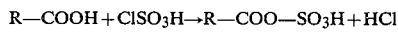
R—COOH+ClSO₃H→R—COO—SO₃H+HCl

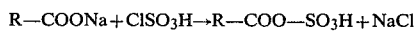
R—COONa+ClSO₃H→R—COO—SO₃H+NaCl

(RCO)₂O+ClSO₃H→R—COO—SO₃H+RCOCl

Sulfonation of the polymer is conducted at a temperature between −100° C. and +100° C., wherein the reaction time is about 1 to about 60 minutes, more preferably about 5 to about 45 minutes and most preferably about 15 to about 30 minutes.

The sulfonation of less substituted olefinic structures such as derived from 1,4-hexadiene terpolymers requires somewhat higher temperatures, e.g. 50° C. when unsaturation levels are low e.g. less than 2 mole %. More highly substituted olefinic structures, such as that derived from 5-ethylidene-2-norbornene, are rapidly sulfonated at room temperature and below even at low levels of unsaturation. The product remains soluble throughout the reaction. It should be pointed out that neither the sulfonating agent nor the manner of sulfonation is critical, provided that the sulfonating method does not degrade or crosslink the polymer backbone.

The amount of desirable sulfonation depends on the particular application. Preferably, the elastomeric polymer is sulfonated at about 10 to about 60 meq. sulfonate groups/100 grams of polymer, more preferably at about 15 to about 50 meq. sulfonate groups/100 grams of polymer, and most preferably at about 20 to about 40 meq. sulfonate groups/100 grams of polymer. The meq. of sulfonate groups/100 grams of polymer is determined by dissolving the unneutralized sulfonated polymer in a mixed solvent of 95 parts of toluene and 5 parts of methanol at a concentration level of 50 grams per liter of solvent. The unneutralized sulfonated polymer is titrated with sodium hydroxide in ethanol to an Alizarin-Thymolphthalein end point. The sulfonate level can also be determined from sulfur content which is obtained by Dietert Analysis.

Polymers containing unsaturation and unneutralized sulfonate groups have been found to be somewhat deficient in thermostability. Therefore, it is necessary to neutralize a substantial portion of the unneutralized sulfonate groups as part of the process for the manufacture of the sulfonated elastomeric polymer. Neutralization further improves the physical properties of the sulfonated polymer. In preparing the ionomer it is desirable to neutralize essentially every sulfonate group. In the instant invention, a barium type neutralizing agent is added in sufficient excess to insure the neutralization of substantially all the sulfonate groups.

When the molecular weight of the elastomeric polymer or the concentration of the elastomeric polymer in the nonreactive solvent is too high or when the sulfonate content of the elastomeric polymer is high, gelation can occur due to the ionic interactions between the unneutralized sulfonate groups during sulfonation or between the neutralized sulfonate groups after neutralization. The ionic associations of the sulfonate groups are dissipated by ionic group plasticizers such as polar hydrocarbons.

Neutralization of the sulfonate groups can be effected through barium type neutralizing agents selected from the group consisting of barium hydroxide or a barium salt of carboxylic acids having about 1 to about 4 carbon atoms, in particular barium acetate dissolved in water. However, extremely high cement viscosities or gels can develop due to the effects of the water added during neutralization thereby producing neutralized sulfonated elastomeric cements which cannot be stirred, pumped, poured or otherwise easily handled. Since it is necessary to convert the unneutralized sulfonate groups to the barium sulfonate, it is necessary that these neutralizing agents be soluble in a solvent, even if that solvent is not miscible with the sulfonation cement. The problem of high viscosity of gelation during the neutralization of sulfonation cements can only be overcome by eliminating or substantially lowering the amount of water present in the neutralization system. An effective manner in which this can be done is to use barium type neutralization agent such as barium acetate or barium hydroxide which has a sufficiently high degree to solubility in a polar organic solvent such as an organic carboxylic acid having about 1 to about 4 carbon atoms such as acetic acid, wherein the carboxylic acid is water soluble and has a pKa lower than sulfonic acids.

If the sulfonation cement at the end of the sulfonation is neutralized with an aqueous solution of the barium acetate in the absence of a polar solvent severe gelation occurs. This gelation is not due to covalent crosslinking but due to the ionic associations between the metal sulfonated groups. This gelation can be eliminated by using a solution of the barium acetate or barium hydroxide dissolved in a carboxylic acid having 1 to about 4 carbon atoms such as acetic acid. When higher levels of barium type neutralizing agents are required as a neutralizing agent, it is not possible to fully dissolve the required amount of barium type neutralizing agent in pure carboxylic acid. Accordingly, a mixed solvent system of methanol and the carboxylic acid can be employed. The concentration of barium type neutralizing agent in the solvent system which can be either carboxylic acid alone or a mixture of carboxylic acid and methanol is about 5 to about 35 grams per 100 ml. of solvent; more preferably about 10 to about 30; and most preferably about 15 to about 25. It is also possible to have minimal amounts of water present in the solvent system, but the volume % of water must be less than 35%, more preferably less than 30% and most preferably less than 20%.

At the higher carboxylic acid concentrations, the neutralized cement viscosities are the lowest and the most desirable; however, it is desirable to keep the carboxylic acid concentrations low in order to prevent polymer precipitation and to facilitate the separation of solvent from carboxylic acid after the solvent is evaporated from the polymer in the steam stripping operation.

The amount of water is kept at a minimum and is generally dictated not only by the solubility of the neutralizing agent but also the concentration of the base polymer, the concentration of the unneutralized sulfonate groups, and the desired ratio of metal ion to unneutralized sulfonate groups in the neutralized cement. Water concentration of about 3.5 volume % or less based on the volume of the non-reactive solvent, more preferably less than about 2.5 volume % and preferably less than about 1.5 volume % is effective in producing cements with sufficiently low viscosities. The viscosities of the neutralized cements are considered processable, when the room temperature Brookfield viscosities do not exceed 50,000 centipoise (cps) at 3.0 rpm, preferably less than 20,000 cps and most preferably about 1000 to about 10,000 cps.

It should be apparent to those skilled in the art that those neutralized cements having viscosities of about 20,000 to about 50,000 cps are not as readily processed at ambient temperatures. It is usually observed, however, that increasing the temperatures of the cement by 10° to 25° C. above room temperature is effective in lowering the cement viscosity to a more desirable lower range below 50,000 cps. Therefore, it is within the spirit of this invention to include those cements whose viscosities at room temperature are above 50,000 cps but which can be further lowered to some extent by increasing the temperature of said cements.

To the neutralized cement of the sulfonated elastomeric polymer can optionally be added a linear, saturated organic carboxylic acid having about 10 to about 40 carbon atoms, more preferably about 12 to 26 carbon atoms, more preferably about 14 to about 20 carbon atoms. The most preferred acid is stearic acid, wherein the organic carboxylic acid reacts with excess barium type neutralizing agent in situ to form the barium salt of the higher molecular weight carboxylic acid which is a preferential plasticizer for the barium neutralized sulfonate groups of the sulfonated polymer. Sufficient organic carboxylic acid is added to form less than about 35 parts by weight of the barium salt of the organic acid based on 100 parts by weight of the barium neutralized sulfonated polymer; more preferably less than about 30 and most preferably about 8 to about 30.

The metal neutralized sulfonated polymer prepared according to this present invention, can be isolated as a crumb by steam stripping or anti-solvent precipitation process. No surface active agents are needed to prepare the easy handling crumb. The crumb that is obtained is easily washed to remove water soluble impurities such as acetic acid and methanol and is suitable to be fed into a dewatering extruder or to be dried in a fluid bed dryer.

DETAILED DESCRIPTION

The improved process of the present invention can be more readily appreciated by reference to the following examples and tables.

EXAMPLE I

The solubility of barium acetate, $Ba(OOCCH_3)_2$ was determined in glacial acetic acid, water and mixtures of these two solvents. The solvents were added in a given amount to 11.50 g (90.0 milliequivalents) barium acetate and heated nearly to reflux. The resultant solution or mixture was then allowed to cool to room temperature. Observations were conducted over a period of at least 24 hours. The following results were obtained.

| Solution | $CH_3COOH$ ml. | Water, ml. | Solubility Hot | Solubility Cold |
|---|---|---|---|---|
| A | 0 | 10 | No | |
| B | 0 | 15 | No | |
| C | 0 | 20 | Yes | Yes |
| D | 10 | 0 | No | No, massive precipitate |
| E | 10 | 1 | No | No, massive precipitate |
| F | 10 | 2 | Nearly | No, massive precipitate |
| G | 10 | 3 | Yes | Supercools, then massive precipitate |
| H | 10 | 4 | Yes | Yes |
| I | 10 | 5 | Yes | Yes |
| J | 15 | 0 | Yes | Supercools, then massive precipitate |
| K | 15 | 1 | Yes | Yes |
| L | 20 | 0 | Yes | Yes |
| M | 25 | 0 | yes | Yes |

Some of the solutions may have been supercooled, but the solutions were stable during the duration of the test.

Solutions H, J, L and M were added to 50 ml. methanol. Precipitates were obtained in all cases with the exception of solution M.

EXAMPLE II

The solubility of anhydrous barium hydroxide was determined in glacial acetic acid and water. The solvents were added in a given amount to 7.71 g (90.0 milliequivalents) of barium hydroxide and heated nearly to reflux. The resultant solution or mixture was then allowed to cool to room temperature. Observations were conducted over a period of at least 24 hours. The following results were obtained.

| Solution | $CH_3COOH$ ml. | Water ml. | Solubility Hot | Solubility Cold |
|---|---|---|---|---|
| A | 10 | 0 | No | |
| B | 15 | 0 | Yes | Yes, may be supercooled |
| C | 15 | 1 | Yes | Yes, may be supercooled |
| D | 0 | 15 | No | Massive crystallization |
| E | 0 | 25 | Cloudy | Massive crystallization |
| F | 0 | 35 | Cloudy | Substantial precipitate |
| G | 0 | 50 | Cloudy | Substantial precipitate |

It is clear from these data that anhydrous barium hydroxide is considerably more soluble in glacial acetic acid than in water.

EXAMPLE III

The solubility of barium hydroxide octahydrate, $Ba(OH)_2.8H_2O$, was determined in glacial acetic acid and water as described in Examples I and II. Solubility determinations were made with 14.2 g (90.0 milliequivalents) barium acetate octahydrate with the following results.

| Solution | $CH_3COOH$ ml. | Water ml. | Solubility Hot | Solubility Cold |
|---|---|---|---|---|
| A | 10 | 0 | No | |

-continued

| Solution | CH3COOH ml. | Water ml. | Solubility Hot | Cold |
|---|---|---|---|---|
| B | 12.5 | 0 | Yes | Yes |
| C | 15 | 0 | Yes | Yes |
| D | 0 | 25 | Cloudy | Substantial precipitate |
| E | 0 | 50 | Cloudy | Substantial precipitate |

Again, it is clear that the barium hydroxide octahydrate is considerably more soluble in glacial acetic acid than in water.

EXAMPLE IV

The EPDM used in this example contained about 56 weight % ethylene and about 4.4 weight % 5-ethylidene-2-norbornene and possessed a Mooney viscosity (ML, 1+8, 212° F.) of about 20.

Seven hundred grams of EPDM were dissolved in 4740 g (7000 ml.) of Exxon hexane. The EPDM possessed a Brookfield viscosity of 400 cps at room temperature and at 3 rpm. Acetic anhydride (26.0 g, 0.255 mole) was added at room temperature. Then concentrated sulfuric acid (16.3 g, 0.1575 mole $H_2SO_4$, 22.5 mmoles/100 g EPDM) was dripped in at room temperature, and the resultant reaction mixture was stirred for 30 minutes. The sulfonation was terminated through the addition of 278 g (350 ml.) of methanol. The free acid cement possessed a Brookfield viscosity of 400 cps at 3 rpm.

Six 822 g batches of the resultant cement, each equivalent to 100 g of starting EPDM, were weighed out into 2-neck round bottom flasks. These six batches were neutralized with the six neutralizing solutions described in Table I. The neutralizing agents were added at a ratio of 2.0 equivalents neutralizing agent/mole $H_2SO_4$.

cement viscosity when water is replaced as the neutralized agent solvent by glacial acetic acid.

Barium hydroxide dissolved in glacial acetic (IV-D) acid gave a low cement viscosity (4000 cps), but higher than when barium acetate was used. This is believed due to small amounts of water generated by the reaction of $Ba(OH)_2$ with acetic acid.

$$Ba(OH)_2 + 2CH_3COOH \rightarrow Ba(OOCCH_3)_2 + H_2O$$

The use of the octahydrate of barium hydroxide, $Ba(OH)_2 \cdot 8H_2O$ in glacial acetic acid (IV-E) further increased cement viscosity as a result of the water present in the hydrate.

The solubility of barium hydroxide in water is much poorer than that of barium acetate. It was necessary to heat the barium hydroxide and water to achieve solution. The hot to warm solution was added to effect neutralization (IV-F). The resultant cement was so high in viscosity that a Brookfield measurement could not be made.

At the lower level of sulfonation described in this example (about 200 meq. sulfonate/100 g EPDM) barium hydroxide anhydrous or its octahydrate, dissolved in glacial acetic acid, functions as an effective neutralizing solution to produce relatively easily processed neutralized cements. When water is used as the solvent extremely high cement viscosities are the result.

EXAMPLE V

The EPDM and procedures used were identical to those described in Example III.

Seven hundred grams of EPDM were dissolved in 4759 g of Exxon hexane. Acetic anhydride (43.4 g, 0.425 mole) was added at room temperature. Then concentrated sulfuric acid (27.1 g, 0.2625 mole $H_2SO_4$, 37.5 mmoles/100 g EPDM) was dripped in at room tempera-

TABLE I

| | Neutralizing Solutions | | | | |
|---|---|---|---|---|---|
| | Neutralizing Agent | | Solvent for Neutralizing Agent | | Brookfield Viscosity (3 rpm) of Neutralized Cement at R.T., cps |
| Example | Formula | Weight g | Meq.[b] | Glacial Acetic Acid, ml. | Water, ml. | |
| IV-A | Ba(OOCCH3)2 | 5.75 | 45.0 | 5.0 | 2.0 | 4,400 |
| IV-B | Ba(OOCCH3)2 | 5.75 | 45.0 | 10.0 | 0 | 2,320 |
| IV-C | Ba(OOCCH3)2 | 5.75 | 45.0 | 0 | 10.0 | 25,480 |
| IV-D | Ba(OH)2 | 3.86 | 45.0 | 7.5 | 0 | 4,000 |
| IV-E | Ba(OH)2 . 8H2O | 7.10 | 45.0 | 7.5 | 0 | 5,720 |
| IV-F | Ba(OH)2 . 8H2O[a] | 7.10 | 45.0 | 0 | 12.5 | Too viscous to measure, almost a gel |

[a] Was not soluble at room temperature. Was added at a higher temperature. Some precipitate, believed to be barium carbonate, was still present.
[b] Per 100g EPDM. 45 meq./22.5 mmole $H_2SO_4$ = 2.0.

Barium acetate was used in three of the neutralizations. The lowest viscosity, 2320 cps, was obtained when glacial acetic acid was used as the solvent (IV-B). When an equivalent amount of water was used as the solvent (IV-C) the cement viscosity was comparably very high, 25,480 cps. These results dramatically illustrate the deleterious effect of water on cement viscosity. In Example IV-A 7.0 ml. of total solvent was used of which 29% was water. The resultant Brookfield viscosity was about twice as high as when pure acetic acid was used, but still quite acceptably low. These data clearly show the marked improvement in neutralized ture, and the resultant mixture was stirred for 30 minutes. The sulfonation was terminated through the addition of 278 g (350 ml.) of methanol. The free acid cement possessed a Brookfield viscosity of 640 cps at 3 rpm.

Six 829 g batches of the resultant cement, each equivalent to 100 g of starting EPDM, were weighed into 2-neck round bottom flasks. These six batches were neutralized withe the six neutralizing solutions described in Table II. The neutralizing agents were added at a ratio of 2.4 equivalents of neutralizing agent/mole $H_2SO_4$. Brookfield viscosities were determined on the neutralized cements at room temperature and over a range of shear rates.

TABLE II

| | Neutralizing Solutions | | | | Brookfield Viscosity (3 rpm) of Neutralized Cement at R.T., cps |
|---|---|---|---|---|---|
| | Neutralizing Agent | | Solvent for Neutralizing Agent | | |
| Example | Formula | Weight g | Meg.[b] | Glacial Acetic Acid, ml. | Water, ml. | |
| V-A | $Ba(OOCCH_3)_2$ | 11.50 | 90.0 | 10.0 | 4.0 | 37,760 |
| V-B | $Ba(OOCCH_3)_2$ | 11.50 | 90.0 | 20.0 | 0 | 12,680 |
| V-C | $Ba(OOCCH_3)_2$ | 11.50 | 90.0 | 0 | 20.0 | Gelled - dry to touch |
| V-D | $Ba(OH)_2$ | 7.71 | 90.0 | 15.0 | 0 | 25,200 |
| V-E | $Ba(OH)_2 \cdot 8H_2O$ | 14.20 | 90.0 | 15.0 | 0 | Too viscous to measure, almost a gel |
| V-F | $Ba(OH)_2 \cdot 8H_2O$[a] | 14.20 | 90.0 | 0 | 25.0 | Gelled - dry to touch |
| none | — | — | — | — | — | 640 |

[a] Was not soluble at room temperature. Was added at a higher temperature. Some precipitate, believed to be barium carbonate, was still present.
[b] Per 100g EPDM. 90 meq./37.5 mmole $H_2SO_4$ = 2.4.

In Example IV, at lower sulfonate level, neutralization could be affected with aqueous solutions of barium acetate and still obtain a cement with a workable viscosity, although high. Even at this low sulfonate level, the aqueous solution of barium hydroxide gave a cement whose viscosity was too high to measure. In this example, a higher sulfonate level (about 35 meq./100 g EPDM) both these neutralizing solutions (V-C and V-F) gave gels, i.e., the resultant cement could be handled like dough and were not sticky.

The neutralizing solution of barium acetate in acetic acid (V-B) resulted in the lowest cement viscosity (12,680 cps). A higher viscosity was obtained with anhydrous barium hydroxide in acetic acid (V-D), but nevertheless the cement could readily be handled. The use of the combination of acetic acid and water as solvent for barium acetate (V-A) produced a significantly higher cement viscosity, but the cement could be readily handled.

This example clearly demonstrates that a higher sulfonate contents the use of aqueous solutions of barium neutralizing agents is virtually inoperable. The replacement of the water partly or fully with glacial acetic acid results in cement viscosities which are readily processed.

What is claimed is:

1. The process for preparing a cement of a barium neutralized sulfonated polymer having a Brookfield viscosity at 3.0 rpm at room temperature of less than about 50,000 cps which comprises the step of neutralizing a solution of a sulfonated polymer in a non-reactive solvent with excess barium type neutralizing agent dissolved in a solvent system consisting of a carboxylic acid having about 1 to about 4 carbon atoms or a mixture of methanol and said carboxylic acid having about 1 to about 4 carbon atoms to form said barium neutralized sulfonated polymer having about 10 to about 60 meq. of barium sulfonate groups per 100 grams of barium neutralized sulfonated polymer.

2. The process according to claim 1 wherein said non-reactive solvent is selected from the group consisting of aromatic hydrocarbons, aliphatic hydrocarbons, and chlorinated aliphatic hydrocarbons and mixtures thereof.

3. The process according to claim 1 wherein said nonreactive solvent is an aliphatic hydrocarbon.

4. The process according to claim 1 further including the addition of a linear, saturated, long chain carboxylic acid having at least about 10 carbon atoms subsequent to said neutralization with said barium type neutralizing agent, said excess barium reacting in situ with said carboxylic acid having at least about 10 carbon atoms thereby forming a barium salt of said carboxylic acid having at least about 10 carbon atoms.

5. The process according to claim 4 wherein said carboxylic acid having at least about 10 carbon atoms is stearic acid.

6. The process according to claim 1 wherein said barium neutralized sulfonated polymer is removed from said gel-free cement by steam stripping or an anti solvent precipitation process.

7. The process according to claim 1 wherein said sulfonated polymer is formed from a hydrocarbon elastomeric polymer.

8. The process according to claim 7 wherein said hydrocarbon elastomeric polymer is selected from the group consisting of Butyl rubbers and EPDM terpolymers.

9. The process according to claim 8 wherein said EPDM terpolymer consists essentially of about 40 to about 70 wt. % of ethylene, of about 10 to about 53 wt. % of propylene and of about 2 to about 10 wt. % of a non-conjugated diene.

10. The process according to claim 9 wherein said non-conjugated diene is selected from the group consisting of 1,4-hexadiene, dicyclopentadiene, alkylidene substituted norbornenes, alkenyl substituted norbornenes, tetrahydroindene, and alkyl substituted tetrahydroindenes.

11. The process according to claim 10 wherein said non-conjugated diene is 5-ethylidene-2-norbornene.

12. The process according to claim 1, wherein said sulfonated polymer is formed from a polystyrene thermoplastic resin.

* * * * *